US005293440A

United States Patent [19]

Miles et al.

[11] Patent Number: 5,293,440

[45] Date of Patent: Mar. 8, 1994

[54] ENVIRONMENTALLY STABLE FIBER OPTIC POLARIZATION MAINTAINING COUPLERS

[75] Inventors: David J. Miles, Holden; James R. Curley, Hopedale; Frederick J. Gillham, Westborough; David W. Stowe, Milford, all of Mass.

[73] Assignee: Aster Corporation, Hopkinton, Mass.

[21] Appl. No.: 954,266

[22] Filed: Sep. 30, 1992

[51] Int. Cl.[5] .................... G02B 6/10

[52] U.S. Cl. .................... 385/51; 385/11; 385/15; 385/80; 385/91; 385/42; 250/227.19

[58] Field of Search .................... 385/51, 11, 15, 39, 385/41, 42, 48, 52, 80, 91; 250/227.19

[56] References Cited

U.S. PATENT DOCUMENTS

| | | | |
|---|---|---|---|
| 4,495,411 | 1/1985 | Rashleigh | 250/227.19 |
| 4,586,784 | 5/1986 | Tremblay et al. | 350/96.15 |
| 4,746,185 | 5/1988 | Shahidi-Hamedani | 350/96.15 |
| 4,869,570 | 9/1989 | Yokohama et al. | 350/96.15 |
| 4,906,068 | 3/1990 | Olson et al. | 385/43 |
| 5,148,508 | 9/1992 | Anjan et al. | 385/51 |
| 5,166,994 | 11/1992 | Stowe et al. | 385/48 |
| 5,185,835 | 2/1993 | Vial et al. | 385/51 |

OTHER PUBLICATIONS

Paul E. Sanders, "Polarization-Maintaining Couplers Open Up New Applications", Dec. 1991.

*Primary Examiner*—Brian Healy
*Assistant Examiner*—Phan T. Heartney
*Attorney, Agent, or Firm*—Fish & Richardson

[57] ABSTRACT

The invention features a fiber optic coupler package including a rigid substrate and at least two side-by-side optical fibers joined in a coupler region. The substrate has a coefficient of thermal expansion substantially matched to that of the fibers. Each fiber extends axially to opposite sides of the coupler region to a primary and secondary regions of fixation, at each side of the coupler region. In the primary region of fixation, each fiber is separately bonded in close proximity to a rigid mounting surface of the substrate using a small amount of adhesive contiguously disposed on opposite sides of the line of tangency formed by the fiber and the mounting surface. The adhesive is distributed to form a pair of substantially identical masses with mirror symmetry relative to a plane defined by the central fiber axis and the line of tangency. In the secondary region of fixation, extended outward from the coupling region beyond the primary regions of fixation, each fiber has a buffer coating and the fiber is bonded through the buffer coating to the substrate. The coupling region may be formed by the biconically tapered laterally fused process or by bonding the fibers together. The fibers of the coupler may be PM fibers, single mode fibers, multimode fibers, or their combination.

15 Claims, 3 Drawing Sheets

1 48 50 37 1 42 36 36b 40 36a 37b 1 37a 38 34 32 30

ENVIRONMENTALLY STABLE FIBER OPTIC POLARIZATION MAINTAINING COUPLERS

The invention relates to fiber optic couplers, and, more particularly, to polarization maintaining couplers that can properly operate at low temperatures and increased mechanical stress.

BACKGROUND OF THE INVENTION

Fiber optic couplers created for the purpose of splitting (or coupling) the optical power to more than one optical fiber have been widely used. Depending on a desired operation or the coupling function (i.e., coupling ratio, wavelength band of interest, polarization of the transmitted and coupled mode), wide band couplers, wave length independent couplers, single mode couplers, polarization maintaining (PM) couplers, PM hybrid couplers and other couplers have been used. When incorporated in optical systems, the couplers frequently operate at varying temperatures and stress.

Optical systems such as optical communication systems, optical gyroscopes, interferometric sensors require propagation and coupling of light with predetermined polarization mode. Different PM couplers have been described in the literature. FIGS. 1 and FIG. 1A show a polarization maintaining coupler that is similar to a coupler described in U.S. Pat. No. 4,906,068 and other publications. The coupler is embedded in a channel 16 of a rectangular substrate 8, but a circular substrate can also be used. Fibers 10 are embedded in an adhesive 18 that fills the space defined by channel 16 and a cover 20. In seeking to achieve undisturbed propagation of a polarized mode in PM fibers 10 it has been sought to position the fibers on the channel axis in order to create a relatively uniform cross-section of adhesive 18 in which the coated optical fibers 10 (or fibers with exposed cladding 12) are centrally embedded. Cover 20 located on top of channel 16 protects coupling region 14 and, in the ideal situation, helps to maintain axial symmetry of the forces on the fibers that are completely surrounded by the adhesive.

There are several problems with manufacturing and operation of this type of a coupler due to the external forces acting on the optical fibers and thereby disturbing the maintenance of polarization (i.e., creating "cross-talk" or energy transfer between the fast and slow eigenmodes of the polarization maintaining fibers). It is difficult to place the fibers symmetrically within the channel, so that uncontrollable asymmetries occur. To maintain a zero net external force on the fibers, it would be desirable to match the thermal coefficients of expansion of the fibers and the adhesive. However, this is a very difficult if not impossible to achieve, and thus, due to differences in thermal expansion and contraction, thermal changes produce polarization-disturbing forces on the fibers. Another major problem arises upon curing adhesive 18 that shrinks and, if the adhesive non-uniformly surrounds the fiber cover it exerts non-uniform force on the fiber. It is also believed that this method of fabrication enhances any small imperfection in the fibers created in the manufacturing process; the imperfections enhance the cross-talk. In some couplers, the epoxy region beneath cover 20 extends from the polymer covered (buffered) portion of the fibers to the bare cladding exposed portion of the fibers. This type of bonding further disturbs the polarized mode propagating in the fiber.

Furthermore, when the PM coupler is used in a cold environment the adhesive contracts further applying additional stress on the fiber. The stress causes asymmetrical forces which induce cross-talk between the polarized modes in the fiber.

In general, the couplers described by the prior art exhibit a significantly higher cross-talk than 1%, particularly when the coupler is used at low temperatures.

There is a need to create polarization maintaining couplers that can achieve a cross-talk substantially less than 1% between the desired and undesired polarization mode at low temperatures.

Even in contexts not dependent upon maintenance of polarization, there is also a need to have a bonding process that results in a more dependable and uniform mounting of couplers in protective packages.

SUMMARY OF THE INVENTION

In one aspect, the invention features a new type of polarization maintaining coupler that has a minimal cross-talk under extreme conditions (e.g., low temperatures, vibrations). The coupler utilizes a new type of bonding approach that connects each coupler leg on each side of the coupler to a rigid surface or platform located close to the end of a coupler substrate. The exposed fiber touches the platform surface or is in close proximity with the surface over an overlapping region which defines the length of the bond. Each exposed fiber is bonded separately to the platforms that have a coefficient of thermal expansion comparable to the fiber and the substrate. The bonding process, according to the invention, uses very minute droplets of adhesive that have a minimal shrinkage effect. Therefore, it is not necessary to match fully the thermal expansion coefficients of the fibers and the adhesive. The adhesive is disposed symmetrically at each bonding region to maintain a plane of symmetry through the axis of the fiber. The symmetry plane is normal to the substrate and passes through the proximity region of the fiber and the platform.

Preferred embodiments feature PM fibers placed longitudinally with respect to the substrate with their principal axes in a random position or with the major axis of the elliptical stress region aligned with respect to the surface of the platforms at zero or 90°.

One attribute of the invention ensures that the net force caused by the adhesive and the substrate is aligned with one of the principal axes of the PM fibers. Another attribute of the invention is reduction of the total external force due to a reduced amount of the adhesive used in the bonding process. Furthermore, the substrate and the mounting platforms provide an increase in the strength of the optical coupler.

In another aspect, the invention features polarization maintaining fiber optic coupler package including a rigid substrate and a polarization maintaining coupler formed by at least two side-by-side optical fibers, each fiber having a core and a surrounding cladding, at least one of the fibers being a polarization-maintaining fiber with a stress field that produces a polarization-maintaining effect and has two principal axes corresponding to fast and slow eigenmodes, the fibers being joined side-by-side in a coupler region and each fiber extending axially to opposite sides of the coupler region to a region of fixation located at the rigid substrate having a coefficient of thermal expansion substantially matched to that of the fibers. Each of the optical fibers, at each side of the coupler region, is separately fixed at a primary region of fixation to a rigid mounting surface of the substrate. Each optical fiber extends over its respective rigid mounting surface with a side of each the fiber located in close proximity to and in a substantially tangential relationship along a line with its mounting surface. A rigid adhesive deposit, disposed on opposite sides of the line of tangency, forms a pair of substantially identical masses with mirror symmetry, each adhesive mass joined to contiguous surface portions of the fiber and the mounting surface along the line of tangency, the masses effectively bonding the fiber to the mounting surface in a manner that is asymmetrical relative to the central axis of the fiber but symmetrical relative to a plane defined by the central axis and the line of tangency.

Preferred embodiments of this aspect of the invention have one or more of the following features.

The polarization-maintaining fiber with two principal axes of the stress field corresponding to fast and slow eigenmodes has one of the two principal axes aligned with the plane of symmetry in the primary region of fixation at each side of the coupler region.

Each of the coupler fibers is a polarization maintaining fiber with two principal axes of the stress field corresponding to fast and slow eigenmodes, the principal axis being aligned with the plane at each of the primary regions of fixation.

The fast eigenmode principal axis of each of the fibers of the coupler is aligned with the plane at its corresponding mounting surfaces.

The slow eigenmode principal axis of each of the fibers of the coupler is aligned with the plane at its corresponding mounting surfaces.

The fast eigenmode principal axis of one fiber of the coupler is aligned with the plane at its corresponding mounting surfaces and the slow eigenmode principal axis of the other fiber of the coupler is aligned with the plane at its corresponding mounting surfaces.

The other fiber of the coupler may be a single mode optical fiber.

The other fiber of the coupler may be a multimode optical fiber.

In another aspect, the invention features a fiber optic coupler package including a rigid substrate and at least two side-by-side optical fibers, each fiber having a core and a surrounding cladding, the fibers being joined side-by-side in a coupler region and each fiber extending axially to opposite sides of the coupler region to a region of fixation located at the rigid substrate having a coefficient of thermal expansion substantially matched to that of the fibers. Each of the optical fibers, at each side of the coupler region, is separately fixed at a primary region of fixation to a rigid mounting surface of the substrate. Each optical fiber extends over its respective rigid mounting surface with a side of each the fiber located in close proximity to, and in a substantially tangential relationship along a line with its mounting surface. A rigid adhesive deposit, disposed on opposite sides of the line of tangency, forms a pair of substantially identical masses with mirror symmetry, each adhesive mass being joined to contiguous surface portions of the fiber and the mounting surface along the line of tangency, the masses effectively bonding the fiber to the mounting surface in a manner that is asymmetrical relative to the central axis of the fiber but symmetrical relative to a plane defined by the central axis and the line of tangency.

Preferred embodiments of these aspects of the invention include one or more of the following features.

The fibers of the coupler are both single mode fibers, multimode fibers or one single mode fiber and one multimode fiber.

The rigid substrate defines a planar surface, and the package further includes flat platforms, rigidly joined to the planar surface at each side of the coupler region, constructed to define the mounting surfaces of the primary regions of fixation.

The optical fibers have a buffer coating in their outward extensions beyond the primary regions of fixation, and the package further includes secondary regions of fixation adapted to bond the optical fibers through the buffer coating to the substrate.

The coupling region may be formed by the biconically tapered laterally fused process or by bonding the fibers together.

BRIEF DESCRIPTION OF THE DRAWING

FIG. 1 is a partly broken away view of a fiber optic coupler according to prior art, while

DESCRIPTION OF THE PREFERRED EMBODIMENT

Figure 1:
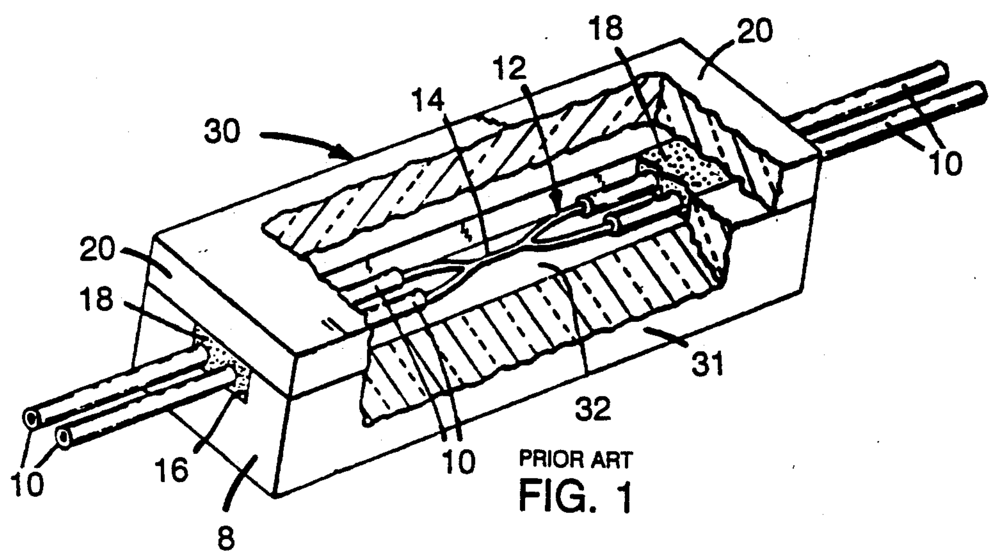
Figure 2:
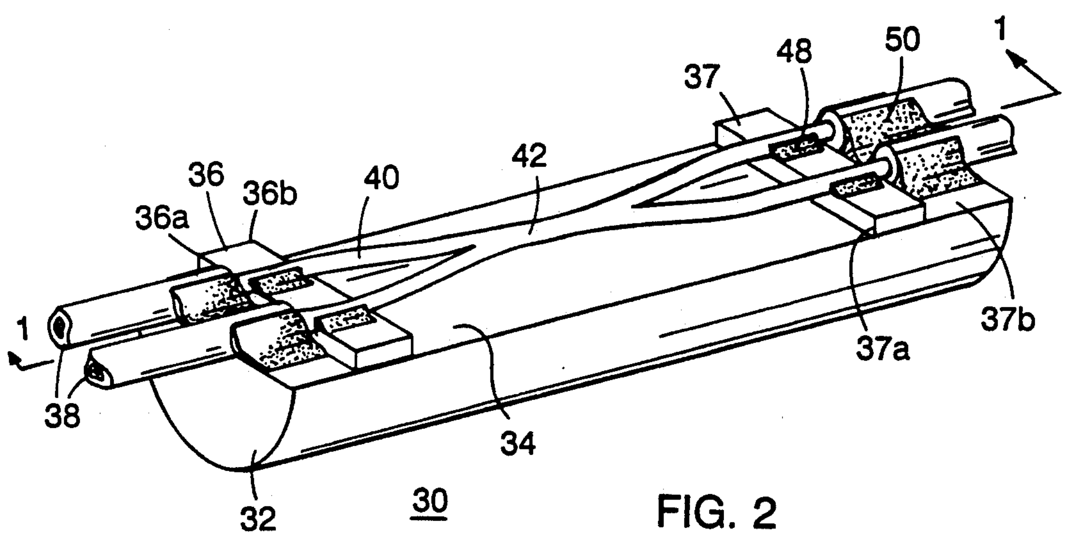
FIG. 2 is an isometric view of a fiber optic coupler according to the invention.
Figure 1A:
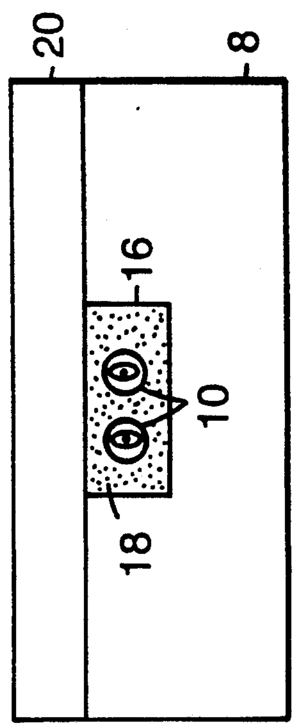
FIG. 1A is a cross-section section of the mounting of the fibers.

Referring to FIG. 2, a rigid semicircular substrate 32 made of quartz with a polished surface 34 and two quartz platforms 36 and 37 of substrate 32 are used for mounting fibers 38. Coupler 30 also includes two polarization maintaining (PM) fibers 38 longitudinally located with respect to substrate 32. Also referring to FIG. 5, each fiber 38 includes a protective polymeric cover or "buffer" 39, cladding 40, an elliptical stress applying region 42 that has two birefringent axes (i.e., major and minor axes of the ellipse), and a core 44. Protective cover 39 is removed over a length that is somewhat longer than the distance between edges **36*a* and 37*b* of the two platforms 36 and 37, respectively. (In FIGS. 2, 3, 4 and 5** the fiber size is scaled up somewhat to better represent the invention.)

A coupling region 46 is fabricated by a biconically tapered fused process. The fusing process is performed by placing the two optical fibers with their claddings 40, side-by-side, aligning the polarization axes of the two fibers and fusing the fibers together. While the fusing is performed, polarized or unpolarized light is launched into one of the fibers. Drawing of the fused region is continued until light emitted from both fibers on the output side reaches a predetermined relationship in respect to the input light.

When the drawing is stopped, the fused portion of the resulting coupler is substantially dumbbell shaped in its cross section. The diameter at the coupler waist is approximately one third to one half of the diameter of the original single fiber and about 1.5 to 1.8 times the diameter of core 44. However, the coupler diameter is a function of the desired coupling ratio. In the fusing process, the aligned lengths are heated by a wide torch so that there is no need to move the torch relative to the adjoining lengths of the fibers. The fused portion of the resulting coupler is several millimeters in length.

The drawing process creates biconically tapered cross-section of both fiber claddings 40 in and around coupling region 46. Coupling region 46 is suspended above surface 34. Rigid surface 34 of substrate 32 is about 30 millimeters long and about 2 to 3 millimeters wide. The mounting platforms 36 and 37 are, about 2 to 3 millimeters long, 1.8 millimeters wide and about 160 μm thick.

Figure 4:
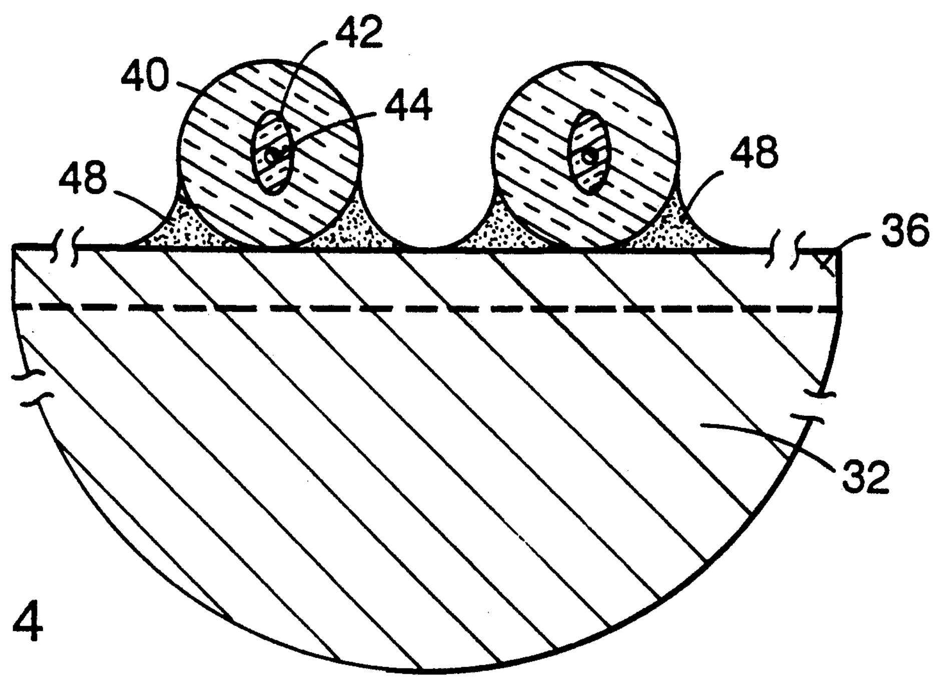
FIG. 4 is a cross-sectional view of the fiber optic coupler of FIG. 3 in the 2-2 direction.

The bonding approach, in accordance with the invention, does not attempt to eliminate outside stress on the fibers completely, as is the case of some prior art. On the contrary, bond 48 creates a small, directional outside force that is applied on the fiber. Bond 48 is illustrated in FIG. 4, wherein each of the two fibers 38 is bonded discretely on the platform surface using an adhesive. It is important to note that the total outside force and its dependence on ambient temperature is reduced due to much smaller amounts of adhesive used in the primary bonds 48.

As shown in FIG. 2, the four legs extended from the coupling region 46 with their fiber claddings 40 touching or located in a close proximity to the top surfaces of platforms 36 and 37 are bonded along the entire length of the platforms. A bonding material applied at the primary bonding regions 48 forms meniscus-type surfaces that extend to a height of about one third to one half of the fiber diameter. Each meniscus of the adhesive material extends to about twice the fiber diameter on the platform surface.

Figure 3:
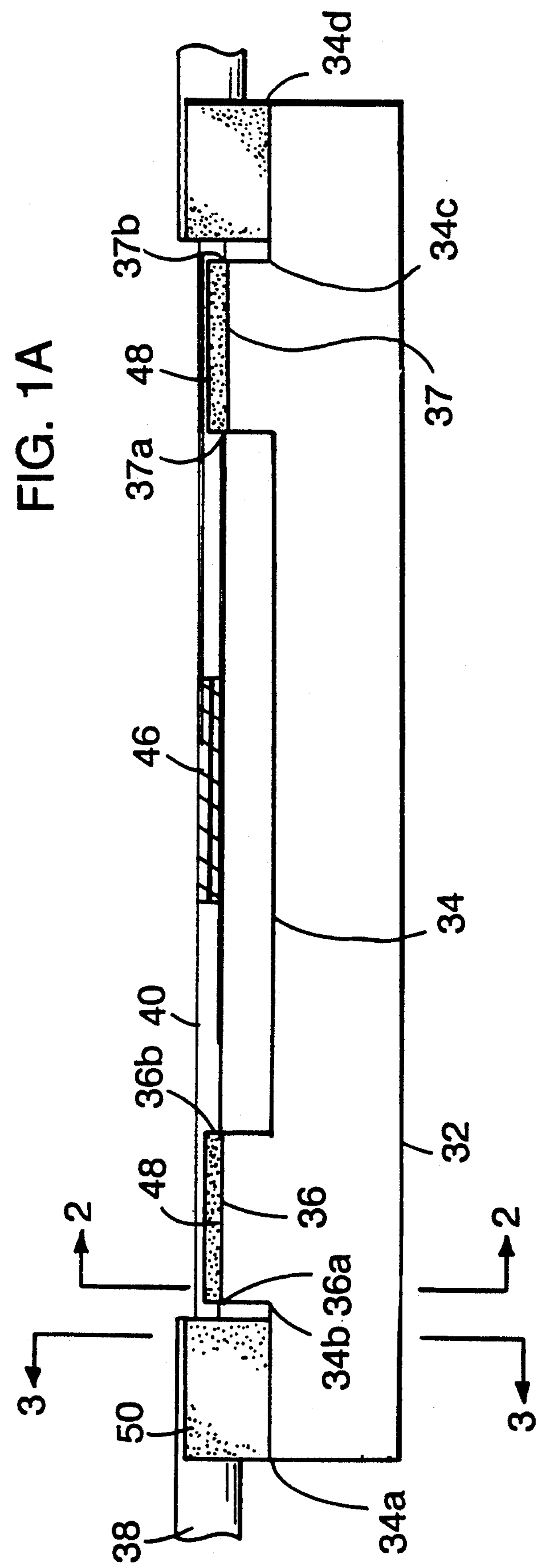
FIG. 3 is a cross-sectional view of the fiber optic coupler of FIG. 2 in the 1—1 direction.

Referring to FIG. 3, another two bonds 50, not essential for practicing the inventions, are located in secondary regions of fixation between the edges 34*a*, 34*b*, 34*c* and 34*d*, respectively. Bonds 50 connect the fiber coating 39 to surface 34 of substrate 32 and give increased strength to the extending fiber legs.

Figure 5:
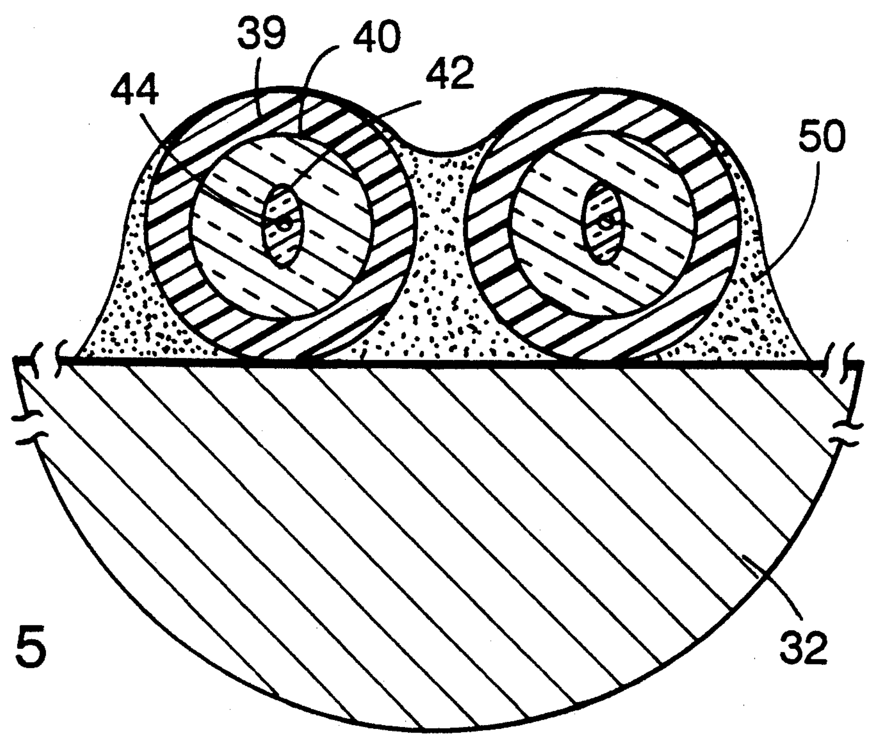
FIG. 5 is a cross-sectional view of the fiber optic coupler of FIG. 3 in the 3—3 direction.

Bonds 50 and 48 are separate with no bonding material overlapping. In contrast with the discrete bonds 48 that use a very small amount of bonding material, bonds 50 practically cover fibers 38, and the bonding material substantially fills the region between the two fibers, as shown in FIG. 5. Bonds 48 isolate and relieves the strains of the coupling region 46 from external forces that are applied. Bonds 50 help to prevent inordinate stress to the region where the fibers are bonded to the mounting platform. Fibers are extended on a straight line between the two bonding regions; this is achieved by platform 34 that has a height approximately equal or larger than the thickness of protective coating 37 (about 160 μm). It is important that the bonding material of bond 50 does not contact the cladding of the optical fiber itself.

Referring to FIGS. 3 and 4, bonds 48 are formed by placing a very small amount (on the order of micrograms) of the bonding material on the platform surfaces. Alternatively, the bonding material can be placed on the fibers in the primary bonding regions 48. Next, the fibers are pressed against the platform surface to achieve a substantial connection of fiber cladding 40 and the platform surface. The pressing action expels most of the bonding material to the sides of the fiber. A relatively low viscosity of the bonding material helps to form a substantially uniform bonding area 48 on each side of the fibers. The abrupt platform edges 36*a*, 36*b* and 37*a*, 37*b* terminate the bonds and prevent the bonding material from flowing to coupling region 46.

As described above, the PM fiber has two birefringent axes that correspond to the major and minor axis of the elliptical stress applying region along which two polarization eigenmodes can propagate. The PM fiber has a well-defined intrinsic birefringence $B_{int}=\gamma_s-\gamma_f=2\pi/L_B$, where in $\gamma_s$ and $\gamma_f$ are the effective propagation constants for the slow and fast eigenmodes of polarization and $L_B$ is the best length between these modes.

In an ideal situation, an optical wave linearly polarized along one of the birefringent axis remains in its polarization state as it propagates along the PM fiber. In regions where an arbitrary lateral force acts on the fiber (e.g., external force applied in a direction that does not coincide with any of the principal axes and caused by an adhesive) portion of energy of the polarized wave crosses to the other eigenmode. The cross coupling can be pictured as a change in the orientation of the birefringent axes in the strain region. The new birefringent axes do not coincide with the major and minor axes of the elliptical stress region. The amount of the cross coupled optical power is proportional to the direction and magnitude of the applied lateral force and the length of the fiber over which the force is applied.

The bonding process, according to the invention, achieves that the applied external stress is oriented along one of the two axes when the PM fiber is bonded with one of its axis aligned perpendicular to the surface of the platform. Thus, no change in the orientation of the birefringent axes in the bonding region occurs.

This is achieved by the meniscus of bond 48 that is symmetric on both sides of the optical fiber. When a maximum bonding uniformity is achieved, the net external force on the fiber, formed by the vector addition of the symmetrical forces with respect to the left and right side of the fiber, is oriented perpendicularly to the substrate. If the fiber is also oriented with one of its principal axis perpendicular to the substrate, the orientation of the net external force coincides with the orientation of the principal axis and thus does not change the birefringence and does not effect the polarized mode propagating along the fiber.

Depending on the desired coupling, the fibers 38 can be aligned with their major axes parallel to each other and perpendicular to the surface of the substrate. Alternatively, the major axes can be aligned parallel to the surface of the substrate. The parallel alignment of the major axes enables optimal coupling of the polarized mode from the through-put fiber to the second fiber. In the high performance PM fiber optic couplers, careful alignment of the two axes is crucial.

Depending on the type of the bonding material, the bonds are cured by applying heat or UV light. The invention envisions using different conventional, commercially available bonding materials such as: EPO-TEK 353ND and EPO-TEK 354 (made by Epoxy Technology Inc., 14 Fortune Blvd., Billerica, MA 01821), Uniset UV-301 (made by Amicon, 25 Hartwell Avenue, Lexington, MA 02173), Tra-Bond F113-SC and Tra-Bond 2116 (made by Tra-con Inc., 55 North Street, Medford, MA 02155), and Norland 61, 87 (made by Norland Products Inc., 695 Joyce Kilmer Avenue, New Brunswick, NJ 08902).

The coupler structure of FIG. 2 is enclosed in a polymer tube that goes concentrically around glass substrate 32 to protect it. Adhesive sealant is used at the end of the polymer tube to avoid moisture. The entire structure is then encapsulated in a stainless steel tube to provide the final protection for the device.

PM fiber optic couplers fabricated by the abovedescribed method achieve cross-talk between the propagating fibers of less than 0.5% at room temperature and at −55° C. Furthermore, if the PM fibers are carefully aligned cross-talk of 0.1% can be routinely achieved. This result is substantially better than any PM fiber optic coupler commercially available at this time.

ALTERNATIVE EMBODIMENTS

In another embodiment, platforms 36 and 37 are completely eliminated. Due to a smaller diameter of the fibers in coupling region 46, coupling region 46 is still elevated above surface 34. Small grooves are located on substrate 34 on each side of coupling region 46 to prevent the flow of the bonding material to the coupling region.

In another embodiment, edges 36*b* and 37*a* of platforms 36 and 37, respectively, are eliminated and the platform is sloped toward the center of the substrate. This thicker substrate provides a higher mechanical strength to the coupler package. In order to prevent the flow of the bonding material to the coupling region, a small groove is placed on each sloped platform.

In another embodiment of the PM coupler, the major axes of the two PM fibers are aligned perpendicularly to each other.

Some applications require a relatively low cross-talk between the modes propagated in the through-put fiber and no limitation on the cross-talk for the other fiber. This type of coupler is called a PM hybrid coupler. The hybrid coupler is fabricated by using two PM fibers with one fiber aligned with respect to the surface of the platform and the other fiber positioned randomly. Alternatively, the PM fibers are not aligned. Furthermore, the PM hybrid coupler can be fabricated using a PM fiber and a single mode optical fiber. However, to achieve 1% or less cross-talk between the two propagating polarized modes of the through-put fiber, it is important to align this fiber to a substantial degree, as described above.

In another embodiment, platform 36 is a birefringent crystal with a refractive index smaller than the refractive index of the fiber in the orientation of the polarized propagating mode. The crystal induces a bulk wave mode in the cross-talk orientation and thus effectively further reduces the cross-talk. The desired mode does not excite any bulk wave and remains unaffected.

Although the preferred embodiments describe a polarization maintaining coupler other couplers such as polarization selective couplers, PM wideband couplers, PM wavelength divisional multiplexer couplers, wideband couplers, wavelength flattened couplers, wavelength independent couplers, broad-band coupler and other couplers are within the scope of this invention.

Other embodiments are within the scope of the following claims.

We claim:

1. In a polarization maintaining fiber optic coupler package comprising a rigid substrate and a polarization maintaining coupler formed by at least two side-by-side optical fibers, each fiber having a core and a surrounding cladding, at least one of said fibers being a polarization-maintaining fiber with a stress field that produces a polarization-maintaining effect, the fibers being joined side-by-side in a coupler region and each fiber extending axially to opposite sides of said coupler region to a region of fixation of said rigid substrate having a coefficient of thermal expansion substantially matched to that of said fibers, the improvement comprising:

each of said optical fibers having said cladding, at each side of said coupler region, separately fixed at a primary region of fixation to a rigid mounting surface of said substrate using a rigid adhesive deposit, each optical fiber, at each said primary region of fixation, extending over its respective rigid mounting surface with a side of each said fiber located in close proximity to, and in a substantially tangential relationship along a line with its mounting surface, said rigid adhesive deposit, disposed on opposite sides of the line of tangency, forming a pair of substantially identical masses with mirror symmetry contacting only a portion of said cladding's circumference, and each said adhesive mass joined to contiguous surface portions of said cladding and said mounting surface along said line of tangency, said masses effectively bonding said fiber to said mounting surface, at said primary region of fixation, in a manner that is asymmetrical relative to the central axis of said fiber but symmetrical relative to a surface defined by said central axis and said line of tangency.

2. The polarization-maintaining fiber optic coupler package of claim 1 wherein said polarization-maintaining fiber with two principal axes of said stress field corresponding to fast and slow eigenmodes has one of the two principal axes aligned with said surface of symmetry in said primary region of fixation at each side of said coupler region.

3. The plarization maintaining fiber optic coupler package of claim 1 wherein each of said fibers is a polarization maintaining fiber with two principal axes of said stress field corresponding to fast and slow eigenmodes, one of said principal axes being aligned with said surface of symmetry at each of said primary regions of fixation.

4. The polarization maintaining fiber optic coupler package of claim 3 wherein said fast eigenmode principal axis of each of said fibers is aligned with said surface of symmetry at its corresponding mounting surfaces.

5. The polarization maintaining fiber optic coupler package of claim 3 wherein said slow eigenmode principal axis of each of said fibers is aligned with said surface of symmetry at its corresponding mounting surfaces.

6. The polarization maintaining fiber optic coupler package of claim 3 wherein said fast eigenmode principal axis of one of said fibers is aligned with said surface of symmetry at its corresponding mounting surfaces and said slow eigenmode principal axis of the other of said fibers is aligned with said surface of symmetry at its corresponding mounting surfaces.

7. The polarization maintaining fiber optic coupler package of claim 1 or 2 wherein one of said fibers is said polarization-maintaining fiber and the other fiber is a single mode optical fiber.

8. The polarization maintaining fiber optic coupler package of claim 1 or 2 wherein one of said fibers is said polarization-maintaining fiber and the other fiber is a multimode optical fiber.

9. In a fiber optical coupler package comprising a rigid substrate and at least two side-by-side optical fibers, each fiber having a core and a surrounding cladding, said fibers being joined side-by-side in a coupler region and each fiber extending axially to opposite sides of said coupler region to a region of fixation of said rigid substrate having a coefficient of thermal expansion substantially matched to that of said fibers, the improvement comprising:

each of said optical fibers having said cladding, at each side of said coupler region, separately fixed at a primary region of fixation to a rigid mounting surface of said substrate using a rigid adhesive deposit, each optical fiber, at each of said primary region of fixation, extending over its respective rigid mounting surface with a side of each said fiber located in close proximity to, and in a substantially tangential relationship along a line with its mounting surface, said rigid adhesive deposit, disposed on opposite sides of the line of tangency, forming a pair of substantially identical masses with mirror symmetry contacting only a portion of said cladding's circumference, and each said adhesive mass joined to contiguous surface portions of said cladding and said mounting surface along said line of tangency, said masses effectively bonding said fiber to said mounting surface, at said primary region of fixation, in a manner that is asymmetrical relative to the central axis of said fiber but symmetrical relative to a surface defined by said central axis and said line of tangency.

10. The fiber optic package of claim 9 comprising two fibers wherein the fibers are one of the following: single mode fibers, multimode fibers or one single mode fiber and one multimode fiber.

11. The fiber optic package of claim 1 or 9 wherein said rigid substrate defines a planar surface, and said package further comprises:

flat platforms, rigidly joined to said planar surface at each side of said coupler region, constructed to define said mounting surfaces of said primary regions of fixation.

12. The fiber optic package claim 1 or 9 wherein outward extensions of said optical fibers beyond said primary regions of fixation have a buffer coating, and said package further comprises:

secondary regions of fixation adapted to bond said optical fibers through said buffer coating to said substrate.

13. The fiber optic package claim 1 or 9 wherein said coupling region is formed by biconically tapered laterally fused process.

14. The fiber optic package claim 1 or 9 wherein said coupling region is formed by bonding said fibers together.

15. A polarization maintaining fiber optic coupler package comprising:

two polarization maintaining fibers joined side-by-side in a coupler region and each fiber extending axially to opposite sides of said coupler region, said fibers including a core, a stress field that produces a polarization maintaining effect, and a surrounding cladding, said stress field defining two principal axes corresponding to fast and slow eigenmodes, a rigid substrate with a coefficient of thermal expansion substantially matched to that of said fibers, multiple platforms adapted to form primary regions of fixation of said fibers extending from said coupling region over said platform, each of said optical fibers having said cladding, located in close proximity to its respective platform, separately fixed to said respective platform in a substantially tangential relationship along a line with its mounting surface, a rigid adhesive deposit, disposed in said primary region of fixation on opposite sides of the line of tangency, adapted to connect contiguous surface portions of said cladding to its mounting surface in a manner that does not completely cover said cladding with said deposit and is symmetrical relative to a surface defined by the central axis of said fiber and said line of tangency, secondary regions of fixation located on said substrate and extended axially farther outward from said primary regions of fixation, said optical fibers having a protective coating in regions overlapping said secondary region of fixation and extending outward, and rigid adhesive deposit adapted to connect said optical fiber through said protective coating to said substrate at said secondary regions of fixation.

* * * * *